(12) United States Patent
Li et al.

(10) Patent No.: US 10,601,550 B2
(45) Date of Patent: Mar. 24, 2020

(54) DATA TRANSMISSION METHOD AND COMMUNICATIONS DEVICE

(71) Applicant: Huawei Technologies Co., Ltd., Shenzhen (CN)

(72) Inventors: Bo Li, Xi'an (CN); Bo Yang, Xi'an (CN); Yunbo Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 311 days.

(21) Appl. No.: 15/248,790

(22) Filed: Aug. 26, 2016

(65) Prior Publication Data

US 2016/0373214 A1 Dec. 22, 2016

Related U.S. Application Data

(63) Continuation of application No. PCT/CN2014/072728, filed on Feb. 28, 2014.

(51) Int. Cl.
*H04L 1/08* (2006.01)
*H04L 1/06* (2006.01)
(Continued)

(52) U.S. Cl.
CPC ............ *H04L 1/08* (2013.01); *H04L 1/06* (2013.01); *H04L 1/1657* (2013.01);
(Continued)

(58) Field of Classification Search
CPC . H04L 1/08; H04L 1/06; H04L 1/1657; H04L 1/1812; H04W 4/06; H04W 74/0816; H04W 84/12
See application file for complete search history.

(56) References Cited

U.S. PATENT DOCUMENTS 5,790,551 A * 8/1998 Chan ................ H04W 74/0866
370/348
6,480,525 B1 * 11/2002 Parsa ..................... H04B 1/707
370/342
(Continued)

FOREIGN PATENT DOCUMENTS

CN 101835163 A 9/2010
CN 102802234 A 11/2012
(Continued)

OTHER PUBLICATIONS

"IEEE Standard for Information Technology—Telecommunications and information exchange between systems Local and metropolitan area networks—Specific requirements; Part 11: Wireless LAN Medium Access Control (MAC) and Physical Layer (PHY) Specifications," IEEE Computer Society, IEEE Std 802.11-2012, Institute of Electrical and Electronics, New York, New York (Mar. 29, 2012).
(Continued)

*Primary Examiner* — Cynthia Britt
*Assistant Examiner* — Dipakkumar B Gandhi
(74) *Attorney, Agent, or Firm* — Leydig, Voit & Mayer, Ltd.

(57) ABSTRACT

A communications device includes: a processor, configured to determine a quantity of first idle channels; and a transmitter, configured to send data to a receiving end on each of the first idle channels; wherein the processor is further configured to: determine whether the data is to be resent; and if the data is to be resent, cause the transmitter to resend the data; and continue to determine whether the data is to be resent and, if the data is to be resent, re-determine the quantity of first idle channels and cause the transmitter to resend the data.

16 Claims, 8 Drawing Sheets

(51) Int. Cl.
  *H04L 1/16* (2006.01)
  *H04L 1/18* (2006.01)
  *H04W 4/06* (2009.01)
  *H04W 74/08* (2009.01)
  *H04L 1/02* (2006.01)
  *H04W 84/12* (2009.01)

(52) U.S. Cl.
  CPC ............. *H04L 1/1812* (2013.01); *H04W 4/06* (2013.01); *H04W 74/0816* (2013.01); *H04W 84/12* (2013.01)

(56) References Cited

U.S. PATENT DOCUMENTS

| | | | | |
|---|---|---|---|---|
| 2002/0181637 | A1* | 12/2002 | Nakabayashi | H04L 1/0002 375/358 |
| 2004/0088641 | A1* | 5/2004 | Torsner | H04L 1/1809 714/776 |
| 2006/0171353 | A1* | 8/2006 | Nagata | H04B 7/04 370/329 |
| 2007/0070922 | A1* | 3/2007 | Benveniste | H04L 1/1621 370/254 |
| 2007/0211720 | A1* | 9/2007 | Fuchs | H04L 12/1868 370/390 |
| 2011/0026544 | A1* | 2/2011 | Lombardo | H04L 1/1812 370/475 |
| 2014/0066107 | A1* | 3/2014 | Schmidt | H04W 68/00 455/458 |
| 2014/0071874 | A1 | 3/2014 | Li et al. | |
| 2014/0086256 | A1* | 3/2014 | Raniere | H04L 5/0001 370/401 |
| 2014/0241240 | A1* | 8/2014 | Kloper | H04B 7/024 370/328 |

FOREIGN PATENT DOCUMENTS

| | | |
|---|---|---|
| CN | 102843220 A | 12/2012 |
| CN | 102917402 A | 2/2013 |
| CN | 103582150 A | 2/2014 |

OTHER PUBLICATIONS

"IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6 GHz," IEEE Computer Society, IEEE Std 802.11ac-2013, Institute of Electrical and Electronics Engineers (2013).

"Draft Standard for Information Tehcnology—Telecommunications and information exchange between systems—Local and metropolitan area networks—Specific requirements; Part 11: Wireless LAN Medium Access Control (MAC) and Physical Layer (PHY) specifications, Amendment 4: Enhancements for Very High Throughput for Operation in Bands below 6 GHz," IEEE P802.11ac/D6.0, Institute of Electrical and Electronics Engineers, New York, New York (Jul. 2013).

* cited by examiner

DATA TRANSMISSION METHOD AND COMMUNICATIONS DEVICE

CROSS-REFERENCE TO RELATED APPLICATIONS

This application is a continuation of International Patent Application No. PCT/CN2014/072728, filed on Feb. 28, 2014, which is hereby incorporated by reference in its entirety.

TECHNICAL FIELD

Embodiments of the present invention relate to communications technologies, and in particular, to a data transmission method and a communications device.

BACKGROUND

As wireless applications are becoming increasingly widespread, people have a more urgent demand for a communication bandwidth and network reliability. In a current Wireless Fidelity (WiFi) standard, a data throughout provided by an 802.11a/b/g technology no longer meets an increasing demand. Therefore, to provide a higher data throughout, an Institute of Electrical and Electronics Engineers (IEEE) working group issues the 802.11n standard, which increases a WiFi transmission speed from current 54 Mbps provided by the 802.11a standard and the 802.11g standard to 300 Mbps, or even up to 600 Mbps.

As everyone knows, the most direct method for increasing a network capacity is to increase a communication bandwidth. However, by using a conventional wireless technology, data can only be transmitted on one channel (a frequency bandwidth of the channel is 20 MHz) selected from several channels with a 20 MHz frequency bandwidth each. It is noteworthy that, in the 802.11n standard, a channel binding technology is introduced, that is, two adjacent 20 MHz channels are combined, so that a communication bandwidth is doubled. However, there are only three non-overlapped 20 MHz channels in 2.4 GHz WiFi. Therefore, in the 802.11n standard, a maximum of two 20 MHz channels can be bound, to form a 40 MHz channel resource. Because more channels are available on a 5 GHz frequency of WiFi, the IEEE further optimizes the 802.11n standard by using the 802.11ac standard that is applicable to the 5 GHz frequency band, that is, a bandwidth of bound channels is increased from 20 MHz and 40 MHz in the 802.11n standard to 80 MHz, or even to 160 MHz. In this way, an available spectrum becomes wider, and available channels also consecutively increase.

In the prior art, the 802.11ac standard defines an enhanced request-to-send (RTS)/clear-to-send (CTS) protocol based on the channel binding technology, which have the following two aspects of characteristics: In one aspect, during data transmission, a bandwidth needs to be selected from several fixed bandwidths, including 20 MHz, 40 MHz, 80 MHz, and 160 MHz, and the selected bandwidth includes bandwidth of a primary channel; in the other aspect, no matter how large the selected transmission bandwidth is, the entire bandwidth can only serve as bandwidth of one channel to transmit a piece of data, which is specifically: A sending end duplicates, within an available bandwidth (assuming that the available bandwidth is 80 MHz, and four 20 MHz bound channels are included), an RTS frame three times in a unit of 20 MHz, and in this case, the 80 MHz bandwidth is all occupied, and RTS frames are sent on the 80 MHz bandwidth, that is, four RTS frames are sent on four 20 MHz channels at the same time; afterwards, a receiving end detects a channel and a bandwidth that are available to the receiving end; if a part of the available bandwidth is being used, the receiving end only replies to, on the other part of the available bandwidth that is not being used, the sending end with a CTS frame, and reports the currently available bandwidth of the receiving end in the CTS frame (if the currently available bandwidth is 40 MHz, the 40 MHz bandwidth needs to include the bandwidth of the primary channel); the sending end sends a piece of data on the 40 MHz bandwidth, and then the receiving end replies with a block acknowledgment (Block ACK, BA) frame on a corresponding channel, so that the sending end confirms whether the data is successfully transmitted.

However, although time used for transmitting the data is shortened in the prior art, robustness of the data transmission cannot be improved, and during the data transmission, the bandwidth that includes the bandwidth of the primary channel needs to be selected from the several fixed bandwidths, which limits channel use flexibility.

SUMMARY

The present invention provides a data transmission method and a communications device, so as to resolve a technical problem in the prior art that robustness of data transmission is low and channels are not flexibly used.

According to a first aspect, the present invention provides a communications device, including:
  a determining module, configured to determine a quantity of first idle channels;
  a sending module, configured to send data to a receiving end on each of the first idle channels; and
  a judging module, configured to: determine whether the data is to be resent; and if the data is to be resent, instruct the determining module to continue determining until the judging module determines that the sending module does not need to resend the data; or if the data is not to be resent, instruct the sending module not to resend the data.

With reference to the first aspect, in a first possible implementation manner of the first aspect, the determining module is specifically configured to: determine a second idle channel that can be currently accessed by the communications device; and determine, according to the second idle channel, the quantity of the first idle channels on which the sending module sends the data.

With reference to the first possible implementation manner of the first aspect, in a second possible implementation manner of the first aspect, the sending module is specifically configured to send, by using a same version or different redundancy versions, the data to the receiving end on each of the first idle channels, so that the receiving end performs decoding on the data.

With reference to the first possible implementation manner of the first aspect, in a third possible implementation manner of the first aspect, the determining module is specifically configured to: if a quantity of the second idle channels is equal to 1, determine that the quantity of the first idle channels is equal to 1; or if a quantity of the second idle channels is greater than 1, determine that the quantity of the first idle channels is greater than or equal to 1 and is less than or equal to the quantity of the second idle channels.

With reference to the first possible implementation manner of the first aspect, in a fourth possible implementation manner of the first aspect, the judging module is further configured to determine whether the data currently sent by the sending module is initially transmitted; and if the data currently sent by the sending module is initially transmitted, the determining module determines that the quantity of the first idle channels is equal to 1; or if the data currently sent by the sending module is not initially transmitted, the determining module determines that the quantity of the first idle channels is greater than or equal to 1 and is less than or equal to a quantity of the second idle channels.

With reference to the first aspect, in a fifth possible implementation manner of the first aspect, the sending module is specifically configured to send, in a unicast manner, the data to the receiving end on the first idle channel; and the judging module is specifically configured to: determine whether the data is successfully transmitted; and if the data is successfully transmitted, instruct the sending module not to resend the data; or if the data is not successfully transmitted, determine whether an accumulative quantity of sending times of the data exceeds a preset total quantity of transmission times; and if the accumulative quantity of sending times of the data exceeds the preset total quantity of transmission times, instruct the sending module not to resend the data; or if the accumulative quantity of sending times of the data does not exceed the preset total quantity of transmission times, instruct the determining module to continue determining until the judging module determines that the sending module does not need to resend the data.

With reference to the first aspect, in a sixth possible implementation manner of the first aspect, the sending module is specifically configured to send, in a multicast manner, the data to the receiving end on the first idle channel; and the judging module is specifically configured to: determine whether an accumulative quantity of sending times of the data exceeds a preset total quantity of transmission times; and if the accumulative quantity of sending times of the data exceeds the preset total quantity of transmission times, instruct the sending module not to resend the data; or if the accumulative quantity of sending times of the data does not exceed the preset total quantity of transmission times, instruct the determining module to continue determining until the judging module determines that the sending module does not need to resend the data.

With reference to the first aspect, in a seventh possible implementation manner of the first aspect, the sending module is specifically configured to: send, in a multicast manner, the data to the receiving end on the first idle channel, where the data is a group of data; and send, in a unicast manner, a block acknowledgment request (BAR) frame to the receiving end on the first idle channel, so that the receiving end sends, according to the BAR frame, a block acknowledgment BA frame to the sending end.

With reference to the seventh possible implementation manner of the first aspect, in an eighth possible implementation manner of the first aspect, the judging module is specifically configured to: determine, according to the BA frame, whether all the data is successfully transmitted; and if all the data is successfully transmitted, instruct the sending module not to resend the data; or if part of the data is successfully transmitted, instruct the determining module to continue determining until the judging module determines that the sending module does not need to resend unsuccessfully transmitted data in the data.

With reference to any one of the first possible implementation manner of the first aspect to the eighth possible implementation manner of the first aspect, in a ninth possible implementation manner of the first aspect, the determining module is specifically configured to determine the second idle channel in a request-to-send/clear-to-send RTS/CTS handshake manner.

According to a second aspect, the present invention provides a data transmission method, including:
  performing, by a sending end, a determining operation, so as to determine a quantity of first idle channels;
  sending, by the sending end, data to a receiving end on each of the first idle channels; and
  determining, by the sending end, whether the data is to be resent; and if the data is to be resent, continuing performing, by the sending end, the determining operation until the sending end determines that the data does not need to be resent; or if the data is not to be resent, skipping, by the sending end, resending the data.

With reference to the second aspect, in a first possible implementation manner of the second aspect, the performing, by a sending end, a determining operation, so as to determine a quantity of first idle channels includes:
  determining, by the sending end, a second idle channel that can be currently accessed by the sending end; and
  determining, by the sending end according to the second idle channel, the quantity of the first idle channels on which the sending end sends the data.

With reference to the first possible implementation manner of the second aspect, in a second possible implementation manner of the second aspect, the sending, by the sending end, data to a receiving end on each of the first idle channels includes:
  sending, by the sending end by using a same version or different redundancy versions, the data to the receiving end on each of the first idle channels, so that the receiving end performs decoding on the data.

With reference to the first possible implementation manner of the second aspect, in a third possible implementation manner of the second aspect, the determining, by the sending end according to the second idle channel, the quantity of the first idle channels on which the sending end sends the data includes:
  if a quantity of the second idle channels is equal to 1, determining, by the sending end, that the quantity of the first idle channels is equal to 1; or if a quantity of the second idle channels is greater than 1, determining, by the sending end, that the quantity of the first idle channels is greater than or equal to 1 and is less than or equal to the quantity of the second idle channels.

With reference to the first possible implementation manner of the second aspect, in a fourth possible implementation manner of the second aspect, the determining, by the sending end according to the second idle channel, the quantity of the first idle channels on which the sending end sends the data includes:
  determining, by the sending end, whether the data currently sent is initially transmitted; and
  if the data currently sent is initially transmitted, determining, by the sending end, that the quantity of the first idle channels is equal to 1; or if the data currently sent is not initially transmitted, determining, by the sending end, that the quantity of the first idle channels is greater than or equal to 1 and is less than or equal to a quantity of the second idle channels.

With reference to the second aspect, in a fifth possible implementation manner of the second aspect, the sending, by the sending end, data to a receiving end on each of the first idle channel includes: sending, by the sending end in a unicast manner, the data to the receiving end on the first idle channel; and the determining, by the sending end, whether the data is to be resent includes:
  determining, by the sending end, whether the data is successfully transmitted; and
  if the data is successfully transmitted, skipping, by the sending end, resending the data; or if the data is not successfully transmitted, determining, by the sending end, whether an accumulative quantity of sending times of the data exceeds a preset total quantity of transmission times; and if the accumulative quantity of sending times of the data exceeds the preset total quantity of transmission times, skipping, by the sending end, resending the data; or if the accumulative quantity of sending times of the data does not exceed the preset total quantity of transmission times, continuing performing, by the sending end, the determining operation until the sending end determines that the data does not need to be resent.

With reference to the second aspect, in a sixth possible implementation manner of the second aspect, the sending, by the sending end, data to a receiving end on each of the first idle channel includes: sending, by the sending end in a multicast manner, the data to the receiving end on the first idle channel; and
  the determining, by the sending end, whether the data is to be resent includes:
  determining, by the sending end, whether an accumulative quantity of sending times of the data exceeds a preset total quantity of transmission times; and if the accumulative quantity of sending times of the data exceeds the preset total quantity of transmission times, skipping, by the sending end, resending the data; or if the accumulative quantity of sending times of the data does not exceed the preset total quantity of transmission times, continuing performing, by the sending end, the determining operation until the sending end determines that the data does not need to be resent.

With reference to the second aspect, in a seventh possible implementation manner of the second aspect, the sending, by the sending end, data to a receiving end on each of the first idle channel includes:
  sending, by the sending end in a multicast manner, the data to the receiving end on the first idle channel, where the data is a group of data; and
  sending, by the sending end in a unicast manner, a block acknowledgment request BAR frame to the receiving end on the first idle channel, so that the receiving end sends, according to the BAR frame, a block acknowledgment BA frame to the sending end.

With reference to the seventh possible implementation manner of the second aspect, in an eighth possible implementation manner of the second aspect, the determining, by the sending end, whether the data is to be resent includes:
  determining, by the sending end according to the BA frame, whether all the data is successfully transmitted; and
  if all the data is successfully transmitted, skipping, by the sending end, resending the data; or if part of the data is successfully transmitted, continuing performing, by the sending end, the determining operation until the sending end determines that unsuccessfully transmitted data in the data does not need to be resent.

With reference to any one of the first possible implementation manner of the second aspect to the eighth possible implementation manner of the second aspect, in a ninth possible implementation manner of the second aspect, the determining, by the sending end, a second idle channel that can be currently accessed by the sending end includes:
  determining, by the sending end, the second idle channel in a request-to-send/clear-to-send RTS/CTS handshake manner.

According to the data transmission method and the communications device that are provided in the embodiments of the present invention, a sending end determines a quantity of first idle channels, so that the sending end sends data to a receiving end on each of the first idle channels; and determines whether the data needs to be resent to the receiving end, so as to ensure correct transmission of the data. By using the data transmission method provided in the present invention, robustness of data transmission is improved, and utilization and flexibility of a channel is improved.

BRIEF DESCRIPTION OF DRAWINGS

To describe the technical solutions in the embodiments of the present invention more clearly, the following briefly describes the accompanying drawings for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

Figure 1:
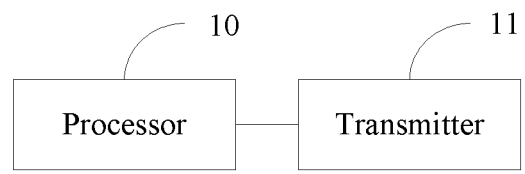
FIG. 1 is a schematic structural diagram of Embodiment 1 of a communications device according to the present invention.

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

A communications device involved in the embodiments of the present invention may be user equipment, or may be a base station device, or may further be a wireless access point, which is not limited in the embodiments of the present invention.

A terminal involved in the embodiments of the present invention may be a wireless terminal, or may be a wired terminal. The wireless terminal may refer to a device that provides a user with voice and/or data connectivity, a handheld device with a wireless connection function, or another processing device connected to a wireless modem. The wireless terminal may communicate with one or more core networks through a radio access network (RAN). The wireless terminal may be a mobile terminal, such as a mobile phone (also referred to as a "cellular" phone) and a computer with a mobile terminal, for example, may be a portable, pocket-sized, handheld, computer built-in, or in-vehicle mobile apparatus, which exchanges voice and/or data with the radio access network. For example, it may be a device such as a personal communication service (PCS) phone, a cordless telephone set, a Session Initiation Protocol (SIP) phone, a wireless local loop (WLL) station, or a personal digital assistant (PDA). The wireless terminal may also be referred to as a system, a subscriber unit, a subscriber station, a mobile station, a mobile terminal, a remote station, a remote terminal, an access terminal, a user terminal, a user agent, a user device, or user equipment.

A base station involved in this application may be an access point in a wireless local area network (WLAN), or a device that communicates with a wireless terminal via one or more sectors on an air interface in an access network. If the communications device is user equipment, a receiving end that performs data transmission with the communications device may be a base station device or a wireless access point; if the communications device is a base station device or a wireless access point, a receiving end that performs data transmission with the communications device may be user equipment. In addition, the communications device involved in the embodiments of the present invention may be applicable to a data transmission scenario in a WLAN, and the communications device has a capability of sensing a busy/idle state of multiple channels and sending and receiving data concurrently on the multiple channels. The data transmission in the WLAN is used as an example to describe the embodiments of the present invention.

FIG. 1 is a schematic structural diagram of Embodiment 1 of a communications device according to the present invention. As shown in FIG. 1, the communications device includes: a processor 10 and a transmitter 11. The processor 10 is configured to determine a quantity of first idle channels; the transmitter 11 is configured to send data to a receiving end on each of the first idle channels; and the processor 10 is further configured to: determine whether the data is to be resent; and if the data is to be resent, continue performing the foregoing determining operation until determining that the transmitter 11 does not need to resend the data; or if the data is not to be resent, instruct the transmitter 11 not to resend the data.

Specifically, the processor 10 makes an agreement with the receiving end in advance on an available channel that is possibly needed in future data transmission. The available channel here may be all channels in a WLAN system (a bandwidth of each channel is 20 MHz), or may further be two or more available channels determined by the processor 10 and the receiving end in a specific agreement manner.

The processor 10 performs the determining operation, so as to determine, on the foregoing available channel, the quantity of the first idle channels. The first idle channel here may be an idle channel on which the communications device does not conflict with another communications device during future data sending and that is determined by the processor 10 by performing an operation such as contention. The foregoing determined first idle channel may include a primary channel, or may not include the primary channel. There may be one first idle channel, or there may be multiple first idle channels. If there are multiple first idle channels, the multiple first idle channels may not be consecutive, that is, this embodiment of the present invention constitutes no limitation on the first idle channel, which can improve utilization and flexibility of a channel.

Afterwards, the processor 10 instructs the transmitter 11 to send the data to the receiving end on each of the foregoing determined first idle channels, so that the receiving end performs corresponding decoding on the data. In addition, the processor 10 may further accumulate a quantity of sending times of the data. If the data is sent on one first idle channel, it indicates that the data is sent once; or if the data is sent on multiple first idle channels, it indicates that the data is sent multiple times.

However, whether the data sent to the receiving end by the transmitter 11 is successfully transmitted or whether the receiving end can perform decoding correctly on the received data concerns whether the processor 10 needs to instruct the transmitter 11 to resend the data. Therefore, to ensure that the data is successfully transmitted, the processor 10 further needs to determine whether the foregoing data needs to be resent. Optionally, when the data transmitted to the receiving end by the transmitter 11 is successfully transmitted, the processor 10 may determine that the transmitter 11 does not need to resend the data; when the data transmitted to the receiving end by the transmitter 11 fails to be transmitted, the processor 10 determines that the transmitter 11 may need to resend the data. If the processor 10 determines that the transmitter 11 needs to resend the foregoing data, the processor 10 may perform the determining operation again, so as to re-determine the quantity of the first idle channels; and instruct the transmitter 11 to resend the foregoing data to the receiving end on each of the first idle channels until the processor 10 determines that the transmitter 11 does not need to resend the foregoing data. If the processor 10 determines that the transmitter 11 does not need to resend the foregoing data, the processor 10 instructs the transmitter 11 not to resend the foregoing data to the receiving end.

According to the communications device provided in this embodiment of the present invention, a processor determines a quantity of first idle channels, so that a transmitter sends data to a receiving end on each of the first idle channel; and the processor further determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Further, the foregoing transmitter 11 may send, by using a same version or different redundancy versions, the data to the receiving end on each of the first idle channels. The receiving end may receive the data on corresponding multiple first idle channels concurrently. That is, the receiving end receives the data on a first idle channel on which a sending end sends the data. Certainly, the receiving end further has a capability of receiving data sent by another communications device on another channel.

The receiving end may perform separate decoding on same data from different first idle channels, or may combine data from the multiple first idle channels to perform joint decoding, so as to reduce a packet error rate of the receiving end. When all the data on the multiple first idle channels uses a same redundancy version, chase combining in a hybrid automatic repeat request (HARQ) may be referred to and used as a joint decoding manner, that is, the receiving end combines the received data by using a maximum ratio combination principle. When the data on the multiple first idle channels respectively uses different redundancy versions, incremental redundancy in the HARQ may be referred to and used as a joint decoding manner, that is, the receiving end combines data that uses different redundancy versions and is from different channels. Because data of a different redundancy version may include an extra check bit that is exclusive to the data itself, a codeword obtained after the combination has a stronger error correction capability.

Based on the foregoing embodiment, in a first possible implementation manner of this embodiment of the present invention, this embodiment relates to a specific process in which when the transmitter 11 sends, in a unicast manner, the data to the receiving end, the processor 10 determines the quantity of the first idle channels and determines whether the transmitter 11 needs to resend the foregoing data. Further, the foregoing processor 10 is specifically configured to: determine a second idle channel that can be currently accessed by the foregoing communications device; and determine, according to the second idle channel, the quantity of the first idle channels on which the transmitter 11 sends the data. If a quantity of the second idle channels is equal to 1, the processor 10 determines that the quantity of the first idle channels is equal to 1; or if a quantity of the second idle channels is greater than 1, the processor 10 determines that the quantity of the first idle channels is greater than or equal to 1 and is less than or equal to the quantity of the second idle channels.

Specifically, when the transmitter 11 sends, in the unicast manner by using a same version or different redundancy versions, the data to the receiving end on each of the first idle channels, the processor 10 performs sensing and backoff in all channels, and after a backoff process ends, at least one second idle channel is detected. If the quantity (k) of the second idle channel is equal to 1, the processor 10 determines that the quantity of the first idle channels is equal to 1; or if the quantity (k) of the second idle channel is greater than 1, the processor 10 determines that the quantity of the first idle channels is greater than or equal to 1 and is less than or equal to the quantity of the second idle channels.

Figure 2:
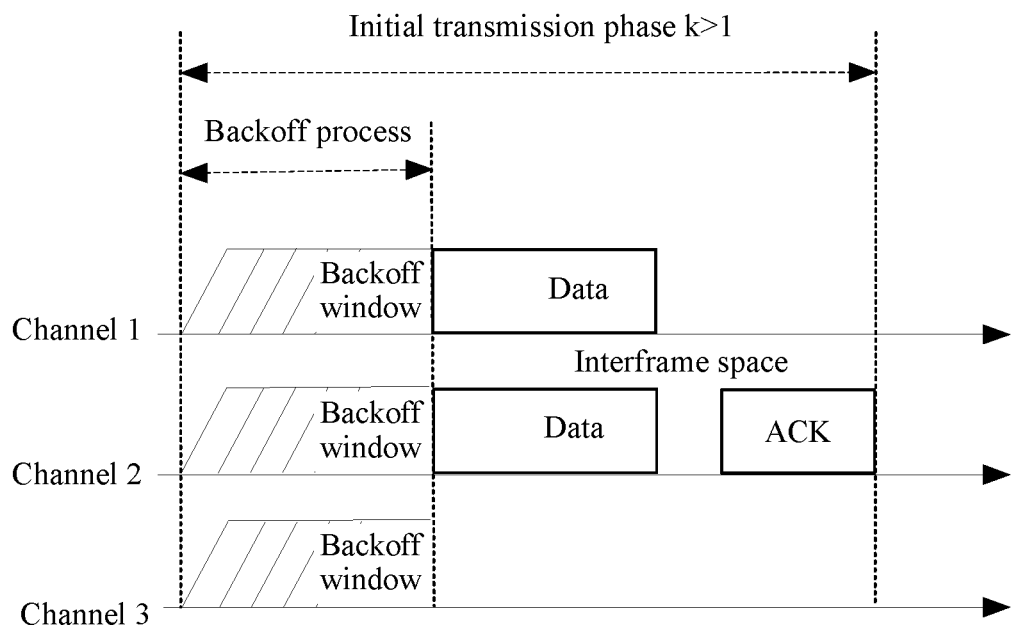
FIG. 2 is a schematic diagram 1 of an access time sequence of data transmission according to present invention.
Figure 3:
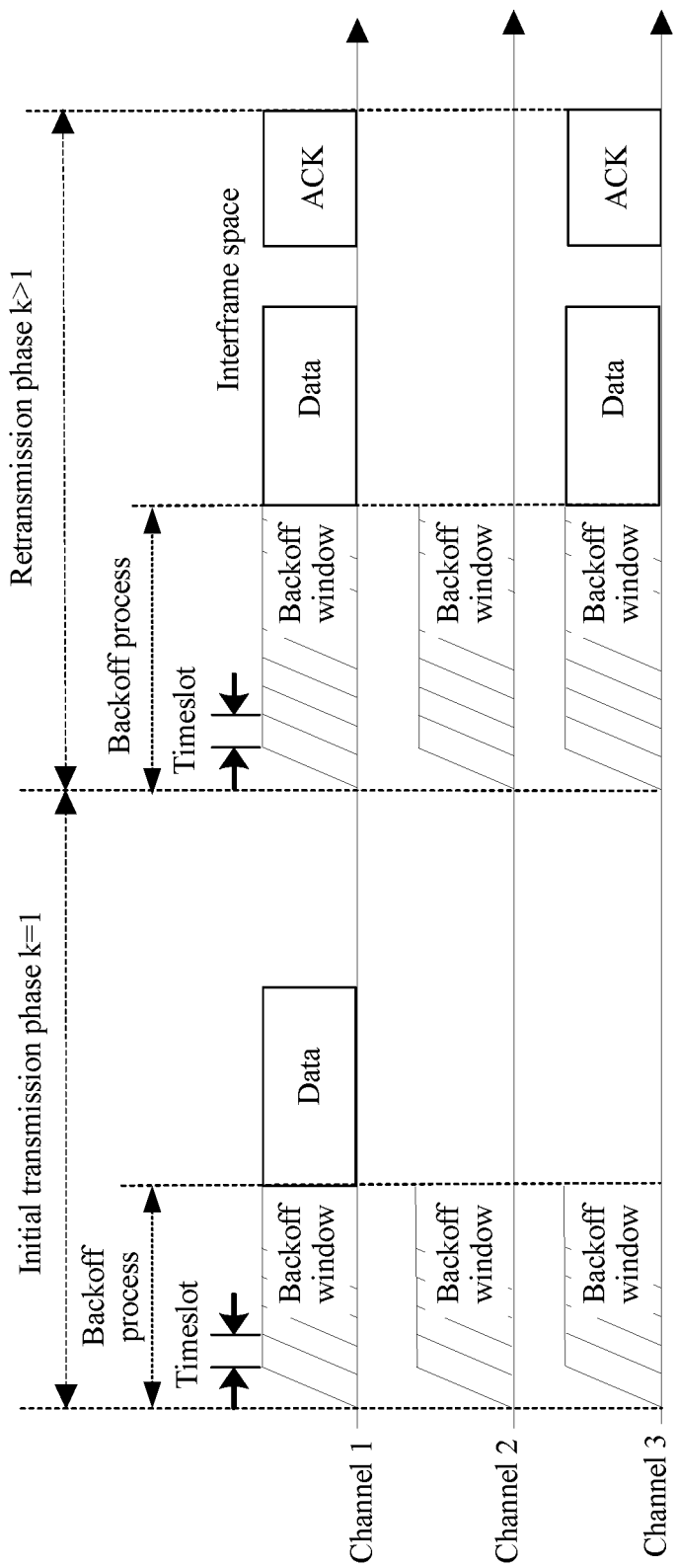
FIG. 3 is a schematic diagram 2 of an access time sequence of data transmission according to present invention.

If a limit on a total quantity of transmission times is not exceeded, the processor 10 selects a first idle channel from the foregoing at least one second idle channel, and instructs the transmitter to send the data on each of the first idle channels. In this case, if the quantity of the second idle channels is greater than 1, the processor 10 selects, from the second idle channel, at least one first idle channel, that is, the quantity of the first idle channels is greater than or equal to 1 and is less than or equal to the quantity of the second idle channels. For example, referring to FIG. 2, two first idle channels, that is, a channel 1 and a channel 2, are selected in FIG. 2; the transmitter 11 separately sends, by using a same version or different redundancy versions, same data on the channel 1 and the channel 2 concurrently. If the quantity of the second idle channels is equal to 1, the processor 10 selects only one idle channel; referring to a channel 1 in FIG. 3, the transmitter 11 sends a piece of data on the channel 1, and when the data is resent, the processor 10 selects multiple first idle channels (or may select one first idle channel).

The processor 10 determines whether the foregoing data is successfully transmitted (the processor 10 may have its own determining mechanism, or may perform determining according to an ACK response from the receiving end); and if the foregoing data is successfully transmitted, instructs the transmitter 11 not to resend the data; or if the foregoing data is not successfully transmitted, determines whether an accumulative quantity of sending times of the data exceeds a preset total quantity of transmission times; and if the accumulative quantity of sending times of the data exceeds the preset total quantity of transmission times, instructs the transmitter 11 not to resend the data; or if the accumulative quantity of sending times of the data does not exceed the preset total quantity of transmission times, continues performing the foregoing determining operation until determining that the transmitter 11 does not need to resend the data. That is, the processor 10 re-determines the quantity of the first idle channels (if it is determined, during retransmission in FIG. 3, that the quantity of the second idle channels is greater than 1, the determined quantity of the first idle channels is 2), and instructs the transmitter 11 to resend the data; and re-determines whether the data is successfully transmitted; and if the data is successfully transmitted, instructs the transmitter 11 not to resend the data; or if the data is not successfully transmitted, continues determining whether the accumulative quantity of sending times of the data exceeds the preset total quantity of transmission times until the processor 10 instructs the transmitter 11 not to resend the data when determining that accumulative quantity of sending times of the data reaches the preset total quantity of transmission times.

According to the communications device provided in this embodiment of the present invention, a processor determines a second idle channel that can be currently accessed by the communications device, and determines a quantity of first idle channels according to the second idle channel, so that a transmitter sends data to a receiving end on each of the first idle channel; and the processor further determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Based on the foregoing embodiment, in a second possible implementation manner of this embodiment of the present invention, this embodiment relates to another specific process in which when the transmitter 11 sends, in a unicast manner, the data to the receiving end, the processor 10 determines the quantity of the first idle channels and determines whether the transmitter 11 needs to resend the foregoing data. Further, the foregoing processor 10 is specifically configured to: determine a second idle channel that can be currently accessed by the foregoing communications device; and determine, according to the second idle channel, the quantity of the first idle channels on which the transmitter 11 sends the data. The processor 10 is specifically configured to: determine whether the data currently sent by the transmitter 11 is initially transmitted; and if the data currently sent by the transmitter 11 is initially transmitted, determine that the quantity of the first idle channels is equal to 1; or if the data currently sent by the transmitter 11 is not initially transmitted, determine that the quantity of the first idle channels is greater than or equal to 1 and is less than or equal to a quantity of the second idle channels.

Figure 4:
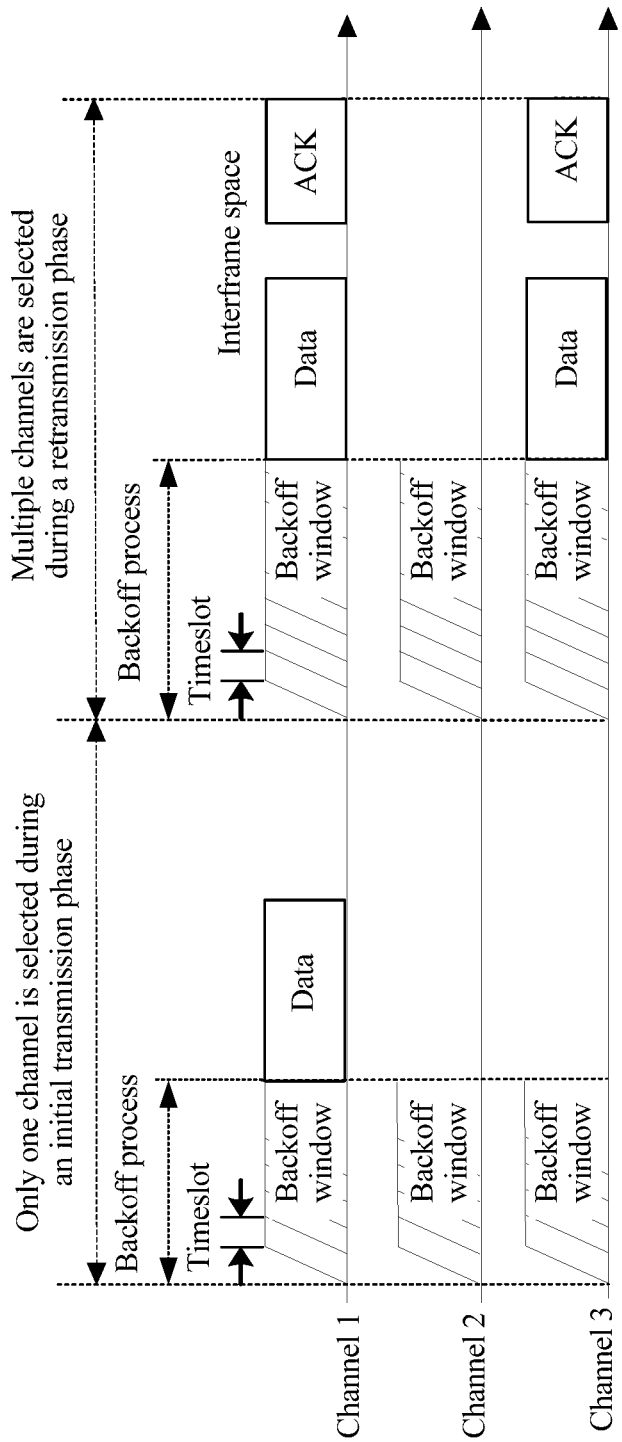
FIG. 4 is a schematic diagram 3 of an access time sequence of data transmission according to present invention.

Specifically, when the transmitter 11 sends, in the unicast manner by using a same version or different redundancy versions, the data to the receiving end on each of the first idle channels, the processor 10 performs sensing and backoff in all channels, and after a backoff process ends, at least one second idle channel is detected. The processor 10 determines whether the data currently sent by the transmitter 11 is initially transmitted; and if the data currently sent by the transmitter 11 is initially transmitted, the processor 10 determines that the quantity of the first idle channels is equal to 1; or if the data currently sent by the transmitter 11 is not initially transmitted, the processor 10 determines that the quantity of the first idle channels is greater than or equal to 1 and is less than or equal to the quantity of the second idle channels; that is, if the transmitter 11 currently resends the data (that is, retransmits the data), the processor 10 may select one or more first idle channels for use by the transmitter 11. FIG. 4 shows an example in which the transmitter 11 selects one first idle channel during the initial transmission, and selects multiple first idle channels when resending the data.

Assuming that, currently, the transmitter 11 initially sends the data to the receiving end, the processor 10 selects one first idle channel from the foregoing at least one second idle channel, and instructs the transmitter to send the data on the first idle channel. In addition, the processor 10 determines whether the data is successfully transmitted; and if the data is successfully transmitted, instructs the transmitter 11 not to resend the data; or if the data is not successfully transmitted, determines whether an accumulative quantity of sending times of the data exceeds a preset total quantity of transmission times; and if the accumulative quantity of sending times of the data exceeds the preset total quantity of transmission times, instructs the transmitter 11 not to resend the data; or if the accumulative quantity of sending times of the data does not exceed the preset total quantity of transmission times, the processor 10 continues performing the foregoing determining operation until determining that the transmitter 11 does not need to resend the data. That is, the processor 10 re-determines whether the transmitter 11 initially transmits the data currently (certainly, the processor 10 performs the determining operation again, which means that the data initially sent by the transmitter 11 fails to be transmitted, and in this case, the data is not initially transmitted by the transmitter 11), re-determines the quantity of the first idle channels (in this case, there may be one determined first idle channel, or there may be multiple first idle channels), and instructs the transmitter 11 to resend the data; and re-determines whether the data is successfully transmitted; and if the data is successfully transmitted, instructs the transmitter 11 not to resend the data; or if the data is not successfully transmitted, continues determining whether the accumulative quantity of sending times of the data exceeds the preset total quantity of transmission times until the processor 10 instructs the transmitter 11 not to resend the data when determining that the accumulative quantity of sending times of the data reaches the preset total quantity of transmission times.

According to the communications device provided in this embodiment of the present invention, a processor determines a second idle channel that can be currently accessed by the communications device, and determines whether data currently sent by a transmitter is initially transmitted; and determines a quantity of first idle channels from the second idle channel, so that the transmitter sends the data to a receiving end on each of the first idle channel; and the processor further determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Based on the foregoing embodiment, in a third possible implementation manner of this embodiment of the present invention, this embodiment relates to a specific process in which when the transmitter 11 sends, in a multicast manner, the data to the receiving end, the processor 10 determines the quantity of the first idle channels and determines whether the transmitter 11 needs to resend the foregoing data. Further, the foregoing processor 10 is specifically configured to: determine a second idle channel that can be currently accessed by the foregoing communications device; and determine, according to the second idle channel, the quantity of the first idle channels on which the transmitter 11 sends the data. If a quantity of the second idle channels is equal to 1, the processor 10 determines that the quantity of the first idle channels is equal to 1; or if a quantity of the second idle channels is greater than 1, the processor 10 determines that the quantity of the first idle channels is greater than or equal to 1 and is less than or equal to the quantity of the second idle channels.

Specifically, when the transmitter 11 sends, in the multicast manner by using a same version or different redundancy versions, the data to the receiving end on each of the first idle channels, the processor 10 performs sensing and backoff in all channels, and after a backoff process ends, at least one second idle channel is detected. If the quantity of the second idle channels is equal to 1, the processor 10 determines that the quantity of the first idle channels is equal to 1; or if the quantity of the second idle channels is greater than 1, the processor 10 determines that the quantity of the first idle channels is greater than or equal to 1 and is less than or equal to the quantity of the second idle channels.

Figure 5:
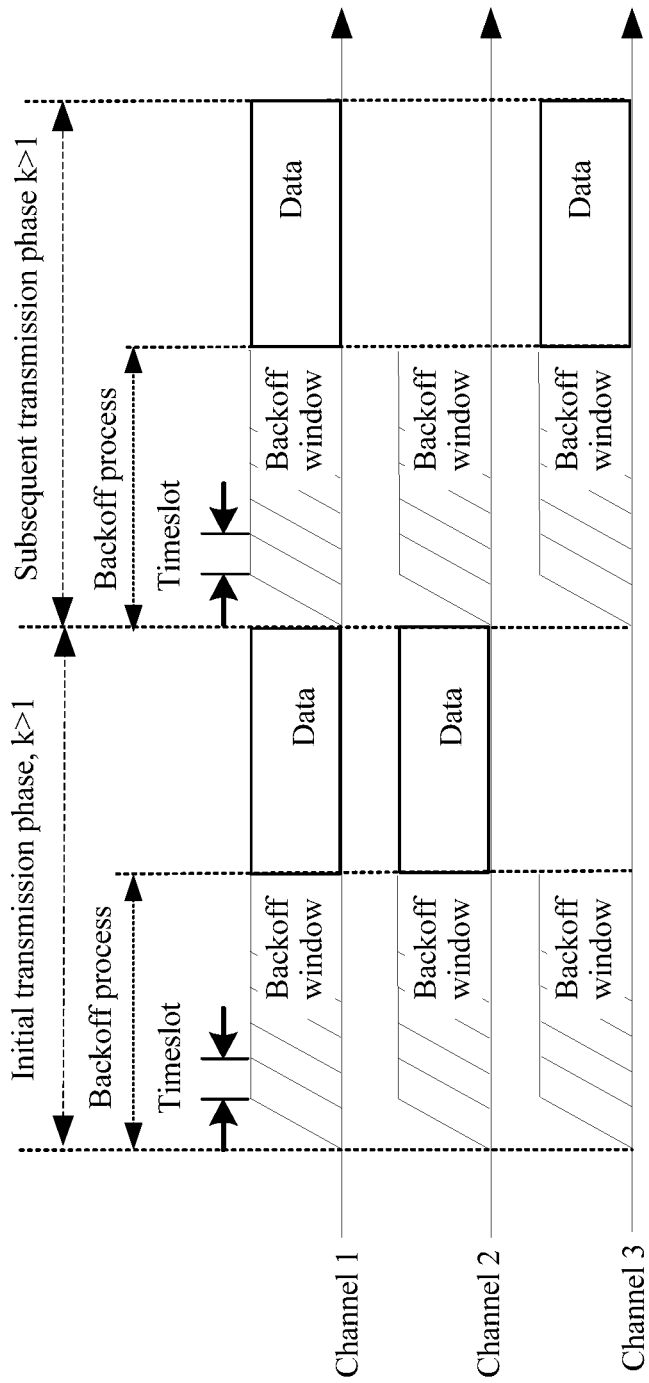
FIG. 5 is a schematic diagram 4 of an access time sequence of data transmission according to present invention.
Figure 6:
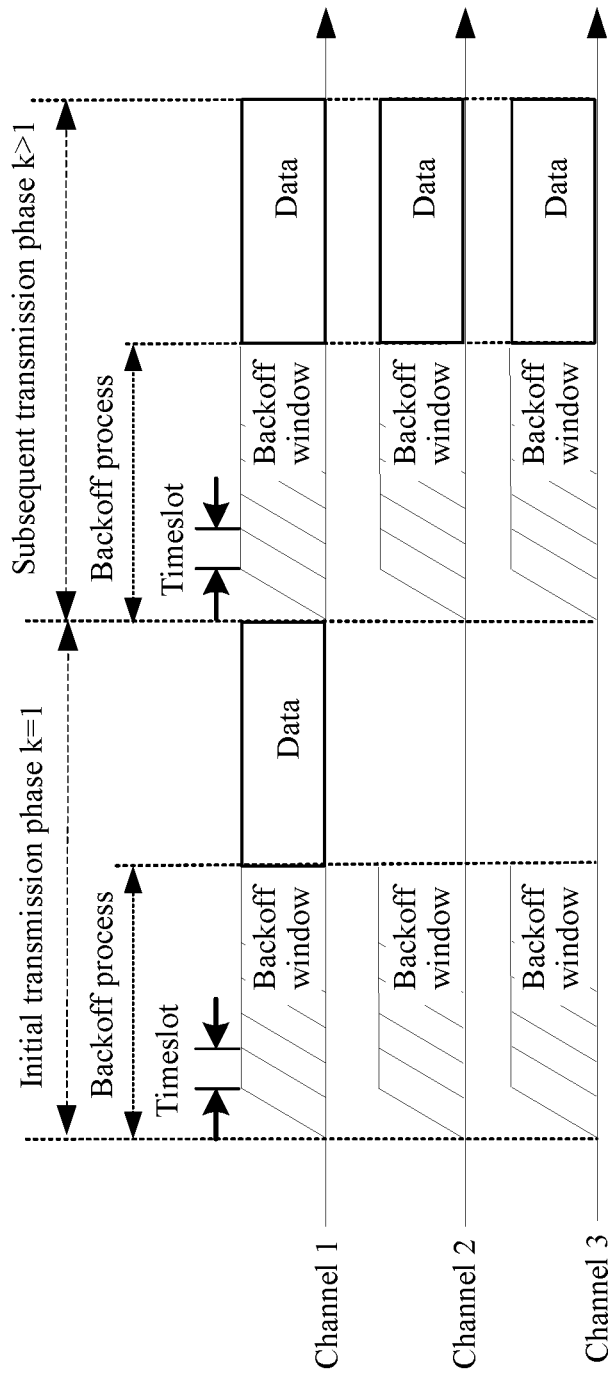
FIG. 6 is a schematic diagram 5 of an access time sequence of data transmission according to present invention.

In this embodiment, the processor 10 does not need to determine whether the data is successfully transmitted, and only needs to directly determine whether an accumulative quantity of sending times of the data exceeds a preset total quantity of transmission times; and if the accumulative quantity of sending times of the data exceeds the preset total quantity of transmission times, the processor 10 instructs the transmitter 11 not to resend the data; or if the accumulative quantity of sending times of the data does not exceed the preset total quantity of transmission times, the processor 10 continues performing the foregoing determining operation until determining that the transmitter 11 does not need to resend the data. That is, the processor 10 re-determines the quantity of the first idle channels (referring to FIG. 5 and FIG. 6); instructs the transmitter 11 to resend the data; and determines whether the accumulative quantity of sending times of the data exceeds the preset total quantity of transmission times until the processor 10 instructs the transmitter 11 not to resend the data when determining that the accumulative quantity of sending times of the data reaches the preset total quantity of transmission times. In an example shown in FIG. 5, the processor 10 selects two first idle channels when the data is initially transmitted (if the quantity k of the second idle channel determined by the processor 10 is greater than 1, the determined quantity of the first idle channels is 2, that is, a channel 1 and a channel 2 are selected); when the transmitter 11 resends the data (in a subsequent transmission phase), the quantity that is of the first idle channel and is re-determined by the processor 10 is also 2 (because the quantity k of the second idle channel re-determined by the processor 10 is greater than 1), that is, the channel 1 and a channel 3 are selected. In an example shown in FIG. 6, the processor 10 selects one first idle channel when the data is initially transmitted (because the quantity k of the second idle channel is equal to 1); when the transmitter 11 resends the data (in a subsequent transmission phase), the processor 10 selects three idle channels (channel 1, channel 2, and channel 3), because the quantity k of the second idle channel determined by the processor 10 when the transmitter 11 resends the data is greater than 1.

According to the communications device provided in this embodiment of the present invention, a processor determines a second idle channel that can be currently accessed by the communications device, and determines a quantity of first idle channels according to the second idle channel, so that a transmitter sends data to a receiving end on each of the first idle channel; and the processor further determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Based on the foregoing embodiment, in a fourth possible implementation manner of this embodiment of the present invention, this embodiment relates to a specific process in which when the transmitter 11 sends, in a multicast manner, a group of data to the receiving end, the processor 10 determines the quantity of the first idle channels and determines whether the transmitter 11 needs to resend the foregoing data. Further, the foregoing processor 10 is specifically configured to: determine a second idle channel that can be currently accessed by the foregoing communications device; and determine, according to the second idle channel, the quantity of the first idle channels on which the transmitter 11 sends the data. If a quantity of the second idle channels is equal to 1, the processor 10 determines that the quantity of the first idle channels is equal to 1; or if a quantity of the second idle channels is greater than 1, the processor 10 determines that the quantity of the first idle channels is greater than or equal to 1 and is less than or equal to the quantity of the second idle channels.

Figure 7:
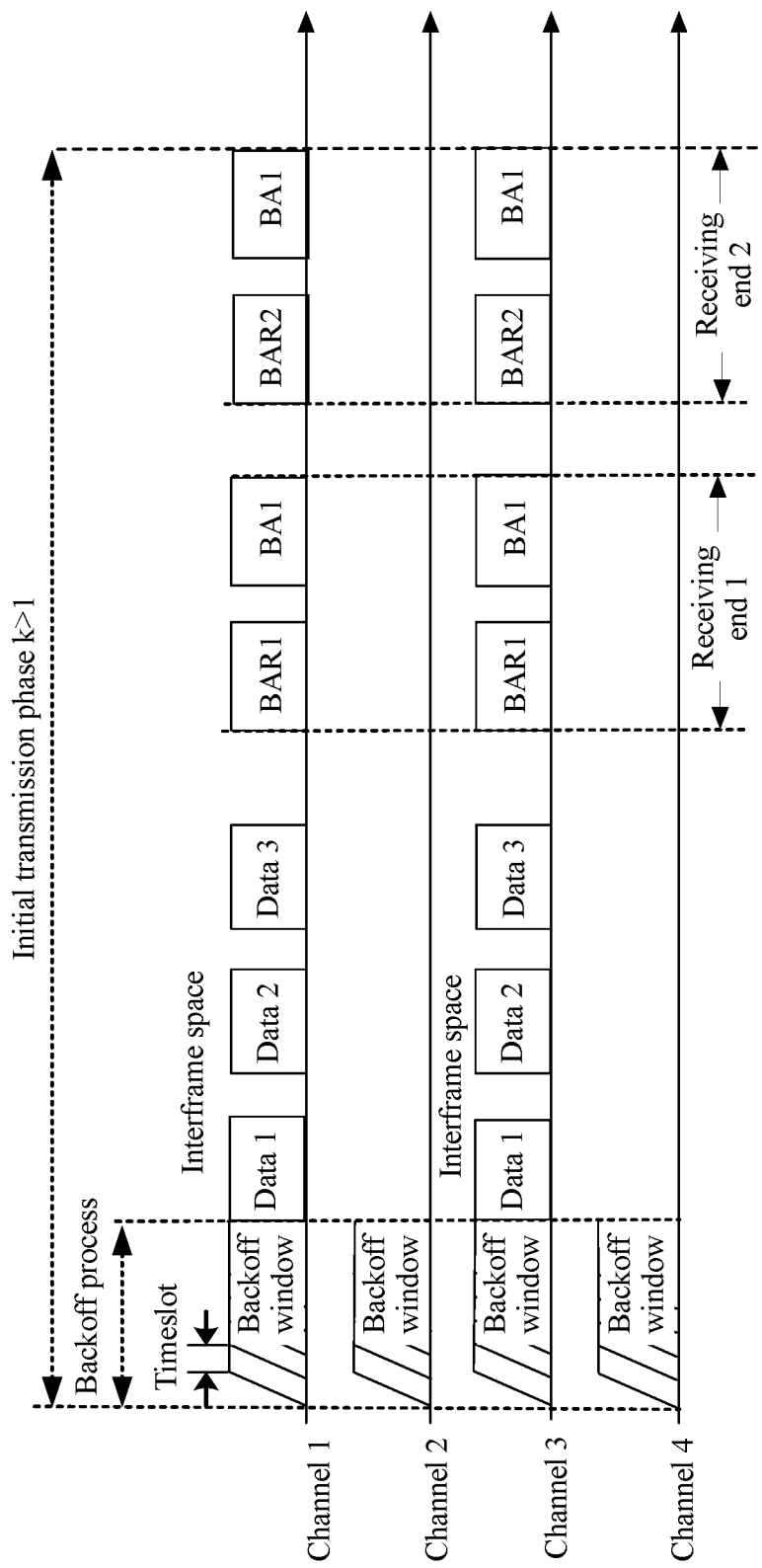
FIG. 7 is a schematic diagram 6 of an access time sequence of data transmission according to present invention.

Specifically, when the transmitter 11 sends, in the multicast manner by using a same version or different redundancy versions, a group of data to multiple receiving ends on each of the first idle channels, the processor 10 performs sensing and backoff in all channels, and after a backoff process ends, at least one second idle channel is detected. If the quantity of the second idle channels is equal to 1, the processor 10 determines that the quantity of the first idle channels is equal to 1; or if the quantity of the second idle channels is greater than 1, the processor 10 determines that the quantity of the first idle channels is greater than or equal to 1 and is less than or equal to the quantity of the second idle channels. FIG. 7 shows that, when the quantity of the second idle channels is greater than 1, and when the transmitter 11 initially sends the data, the processor 10 selects two first idle channels (a channel 1 and channel 3), and a same group of data is separately sent consecutively concurrently, on the channel 1 and the channel 3 by using a same version or different redundancy versions, including Data 1, Data 2, and Data 3.

Figure 8:
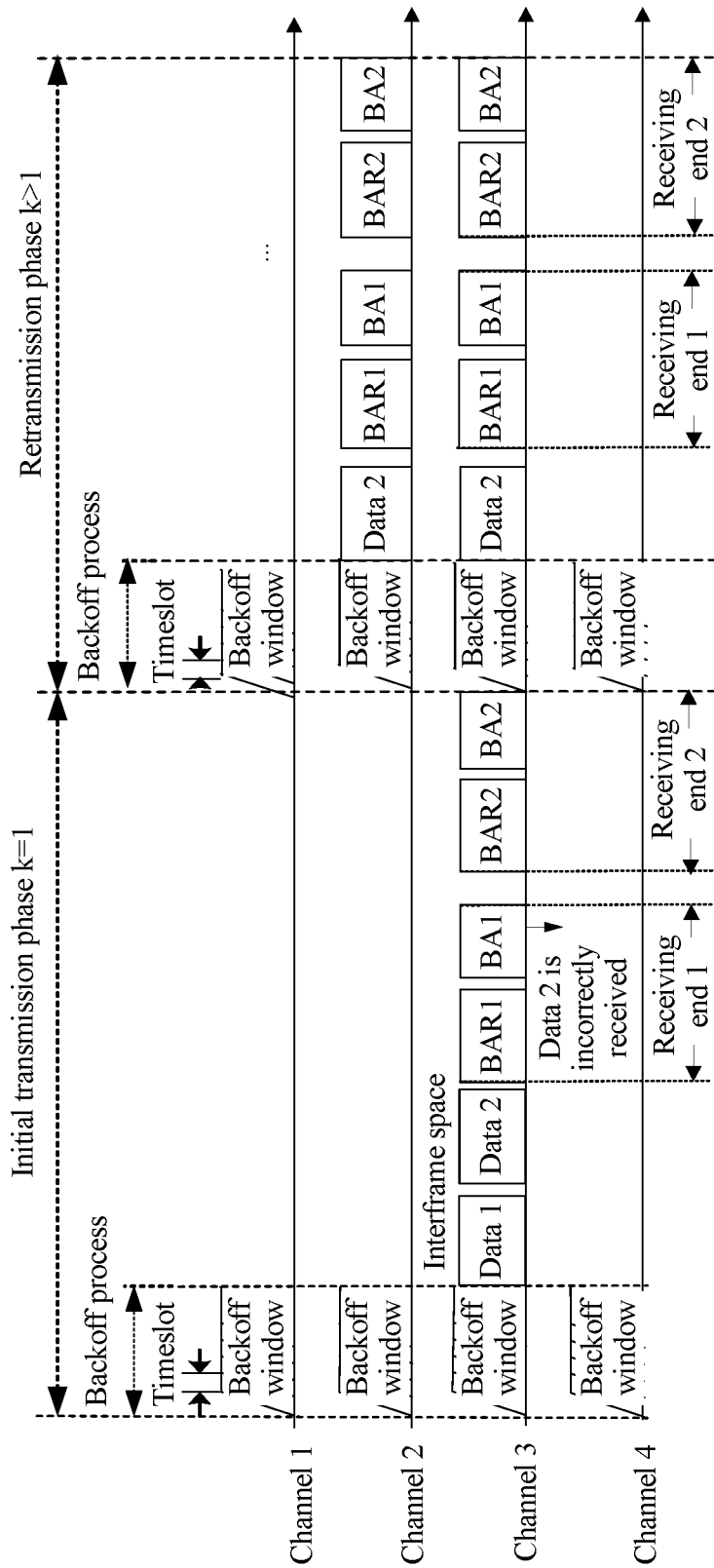
FIG. 8 is a schematic diagram 7 of an access time sequence of data transmission according to present invention.

The transmitter 11 separately sends, in a unicast manner, a BAR frame to all the receiving ends on the foregoing selected first idle channels (for example, the channel 1 and the channel 3 in FIG. 7), so that each of the receiving ends replies to the communications device with a BA frame. The processor 10 determines, according to the replied multiple BA frames, whether all the data in the group is successfully transmitted. If all the data in the group is successfully transmitted, the processor 10 instructs the transmitter 11 not to resend the group of data; or if part of the data in the group is successfully transmitted, the processor 10 continues performing the foregoing determining operation until determining that the transmitter 11 does not need to resend unsuccessfully transmitted data in the data in the group. FIG. 8 shows that, when the transmitter 11 initially transmits the group of data, the processor 10 selects one first idle channel (a channel 3), and when part of the data (Data 2 in FIG. 8) in the group of data fails to be transmitted, the processor 10 selects two first idle channels (a channel 2 and the channel 3) for the transmitter 11 to retransmit the unsuccessfully transmitted data; the transmitter 11 transmits the Data 2 on the channel 2 and the channel 3, and further transmits the BAR frame on the two channels.

Optionally, in all the foregoing possible implementation manners, the processor 10 may determine, by using an RTS/CTS handshake manner, the second idle channel that can be currently accessed by the communications device.

According to the communications device provided in this embodiment of the present invention, a processor determines a second idle channel that can be currently accessed by the communications device, and determines a quantity of first idle channels according to the second idle channel, so that a transmitter sends data to a receiving end on each of the first idle channel; and the processor further determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Figure 9:
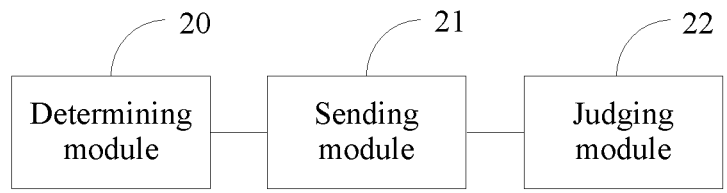
FIG. 9 is a schematic structural diagram of Embodiment 2 of a communications device according to the present invention.

FIG. 9 is a schematic structural diagram of Embodiment 2 of a communications device according to the present invention. As shown in FIG. 9, the communications device includes: a determining module 20, a sending module 21, and a judging module 22. The determining module 20 is configured to determine a quantity of first idle channels; the sending module 21 is configured to send data to a receiving end on each of the first idle channels; and the judging module 22 is configured to: determine whether the data is to be resent; and if the data is to be resent, instruct the determining module 20 to continue performing the foregoing determining operation until the judging module 22 determines that the sending module 21 does not need to resend the data; or if the data is not to be resent, instruct the sending module 21 not to resend the data.

Specifically, the communications device makes an agreement with the receiving end in advance on an available channel that is possibly needed in future data transmission. The available channel here may be all channels in a WLAN system (a bandwidth of each channel is 20 MHz), or may further be two or more available channels determined by the communications device and the receiving end in a specific agreement manner.

The determining module 20 performs the determining operation, so as to determine, on the foregoing available channel, the quantity of the first idle channels. The first idle channel here may be an idle channel on which the communications device does not conflict with another communications device during future data transmission and that is determined by the determining module 20 by performing an operation such as contention. The foregoing determined first idle channel may include a primary channel, or may not include the primary channel; and there may be one first idle channel, or there may be multiple first idle channels. If there are multiple first idle channels, the multiple first idle channels may not be consecutive, that is, this embodiment of the present invention constitutes no limitation on the first idle channel, which can improve utilization and flexibility of a channel.

Afterwards, the sending module 21 sends the data to the receiving end on each of the foregoing determined first idle channels, so that the receiving end performs corresponding decoding on the data. In addition, the foregoing determining module 20 may further accumulate a quantity of sending times of the data. If the data is sent on one first idle channel, it indicates that the data is sent once; or if the data is sent on multiple first idle channels, it indicates that the data is sent multiple times.

However, whether the data sent to the receiving end by the sending module 21 is successfully transmitted or whether the receiving end can performing decoding correctly on the received data concerns whether the judging module 22 needs to instruct the sending module 21 not to resend the data. Therefore, to ensure that the data is successfully transmitted, the judging module 22 further needs to determine whether the foregoing data needs to be resent. Optionally, when the data transmitted to the receiving end by the sending module 21 is successfully transmitted, the judging module 22 may determine that the sending module 21 does not need to resend the data; when the data transmitted to the receiving end by the sending module 21 fails to be transmitted, the judging module 22 determines that the sending module 21 may need to resend the data. If determining that the sending module 21 needs to resend the foregoing data, the judging module 22 instructs the determining module 20 to perform the determining operation again, so that the determining module 20 re-determines the quantity of the first idle channels and the sending module 21 is instructed to resend the foregoing data to the receiving end on each of the first idle channels until the judging module 22 determines that the sending module 21 does not need to resend the foregoing data. If the judging module 22 determines that the sending module 21 does not need to resend the foregoing data, the judging module 22 instructs the sending module 21 not to resend the foregoing data to the receiving end.

According to the communications device provided in this embodiment of the present invention, a determining module determines a quantity of first idle channels, so that a sending module sends data to a receiving end on each of the first idle channel; and a judging module determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Further, the foregoing sending module 21 may send, by using a same version or different redundancy versions, the data to the receiving end on each of the first idle channels. The receiving end may receive the data at the same time on corresponding multiple first idle channels concurrently. That is, the receiving end receives the data on a first idle channel on which a sending end sends the data. Certainly, the receiving end further has a capability of receiving data sent by another communications device on another channel.

The receiving end may perform separate decoding on same data from different first idle channels, or may combine data from the multiple first idle channels to perform joint decoding, so as to reduce a packet error rate of the receiving end. When all the data on the multiple first idle channels uses a same redundancy version, chase combining in a HARQ may be referred to and used as a joint decoding manner, that is, the receiving end combines the received data by using a maximum ratio combination principle. When the data on the multiple first idle channels respectively uses different redundancy versions, incremental redundancy in the HARQ may be referred to and used as a joint decoding manner, that is, the receiving end combines data that uses different redundancy versions and is from different channels; because data of a different redundancy version may include an extra check bit that is exclusive to the data itself, a codeword obtained after the combination has a stronger error correction capability.

Based on the foregoing embodiment, in a first possible implementation manner of this embodiment of the present invention, this embodiment relates to a specific process in which when the sending module 21 sends, in a unicast manner, the data to the receiving end, the determining module 20 determines the quantity of the first idle channels and the judging module 22 determines whether the sending module 21 needs to resend the foregoing data. Further, the foregoing determining module 20 is specifically configured to: determine a second idle channel that can be currently accessed by the foregoing communications device; and determine, according to the second idle channel, the quantity of the first idle channels on which the sending module 21 sends the data. If a quantity of the second idle channels is equal to 1, the determining module 20 determines that the quantity of the first idle channels is equal to 1; or if a quantity of the second idle channels is greater than 1, the determining module 20 determines that the quantity of the first idle channels is greater than or equal to 1 and is less than or equal to the quantity of the second idle channels.

Specifically, when the sending module 21 sends, in the unicast manner by using a same version or different redundancy versions, the data to the receiving end on each of the first idle channels, the communications device performs sensing and backoff in all channels, and after a backoff process ends, at least one second idle channel is detected. If the quantity (k) of the second idle channel is equal to 1, the determining module 20 determines that the quantity of the first idle channels is equal to 1; or if the quantity (k) of the second idle channel is greater than 1, the determining module 20 determines that the quantity of the first idle channels is greater than or equal to 1 and is less than or equal to the quantity of the second idle channels.

If a limit on a total quantity of transmission times is not exceeded, the determining module 20 selects a first idle channel from the foregoing at least one second idle channel, so that the sending module 21 is instructed to send the data on each of the first idle channels. In this case, if the quantity of the second idle channels is greater than 1, the determining module 20 selects, from the second idle channel, at least one first idle channel, that is, the quantity of the first idle channels is greater than or equal to 1 and is less than or equal to the quantity of the second idle channels. For example, referring to FIG. 2, two first idle channels, that is, a channel 1 and a channel 2, are selected in FIG. 2; the sending module 21 separately sends, by using a same version or different redundancy versions, same data on the channel 1 and the channel 2 concurrently. If the quantity of the second idle channels is equal to 1, the determining module 20 selects only one idle channel; referring to a channel 1 in FIG. 3, the sending module 21 sends data on the channel 1, and when the data is resent, the determining module 20 selects multiple first idle channels (or may select one first idle channel).

The judging module 22 determines whether the foregoing data is successfully transmitted (the judging module 22 may have its own determining mechanism, or may perform determining according to an ACK response from the receiving end); and if the foregoing data is successfully transmitted, instructs the sending module 21 not to resend the data; or if the foregoing data is not successfully transmitted, determines whether an accumulative quantity of sending times of the data exceeds a preset total quantity of transmission times; and if the accumulative quantity of sending times of the data exceeds the preset total quantity of transmission times, instructs the sending module 21 not to resend the data; or if the accumulative quantity of sending times of the data does not exceed the preset total quantity of transmission times, instructs the determining module 20 to continue performing the foregoing determining operation until the judging module 22 determines that the sending module 21 does not need to resend the data. That is, the determining module 20 re-determines the quantity of the first idle channels (if it is determined, during retransmission in FIG. 3, that the quantity of the second idle channels is greater than 1, the determined quantity of the first idle channels is 2), so that the sending module 21 is instructed to resend the data; and the judging module re-determines whether the data is successfully transmitted; and if the data is successfully transmitted, instructs the sending module 21 not to resend the data; or if the data is not successfully transmitted, continues determining whether the accumulative quantity of sending times of the data exceeds the preset total quantity of transmission times until the judging module 22 instructs the sending module 21 not to resend the data when determining that the accumulative quantity of sending times of the data reaches the preset total quantity of transmission times.

According to the communications device provided in this embodiment of the present invention, a determining module determines a second idle channel that can be currently accessed by the communications device, and determines a quantity of first idle channels according to the second idle channel, so that a sending module sends data to a receiving end on each of the first idle channel; and a judging module further determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Based on the foregoing embodiment, in a second possible implementation manner of this embodiment of the present invention, this embodiment relates to another specific process in which when the sending module 21 sends, in a unicast manner, the data to the receiving end, the determining module 20 determines the quantity of the first idle channels and the judging module 22 determines whether the sending module 21 needs to resend the foregoing data. Further, the foregoing determining module 20 is specifically configured to: determine a second idle channel that can be currently accessed by the foregoing communications device; and determine, according to the second idle channel, the quantity of the first idle channels on which the sending module 21 sends the data. The foregoing judging module 22 is specifically configured to determine whether the data currently sent by the sending module 21 is initially transmitted; and if the data currently sent by the sending module 21 is initially transmitted, the determining module 20 determines that the quantity of the first idle channels is equal to 1; or if the data currently sent by the sending module 21 is not initially transmitted, the determining module 20 determines that the quantity of the first idle channels is greater than or equal to 1 and is less than or equal to a quantity of the second idle channels.

Specifically, when the sending module 21 sends, in the unicast manner by using a same version or different redundancy versions, the data to the receiving end on each of the first idle channels, the communications device performs sensing and backoff in all channels, and after a backoff process ends, at least one second idle channel is detected. The judging module 22 determines whether the data currently sent by the sending module 21 is initially transmitted; and if the data currently sent by the sending module 21 is initially transmitted, the determining module 20 determines that the quantity of the first idle channels is equal to 1; or if the data currently sent by the sending module 21 is not initially transmitted, the determining module 20 determines that the quantity of the first idle channels is greater than or equal to 1 and is less than or equal to the quantity of the second idle channels; that is, if the sending module 21 currently resends the data (that is, retransmits the data), the determining module 20 may select one or more first idle channels for use by the sending module 21. FIG. 4 shows an example in which the sending module 21 selects one first idle channel during the initial transmission, and selects multiple first idle channels when resending the data.

Assuming that, currently, the sending module 21 initially sends the data to the receiving end, the determining module 20 selects one first idle channel from the foregoing at least one second idle channel, and the judging module 22 instructs the sending module 21 to send the data on the first idle channel. In addition, the judging module 22 determines whether the data is successfully transmitted; and if the data is successfully transmitted, instructs the sending module 21 not to resend the data; or if the data is not successfully transmitted, determines whether an accumulative quantity of sending times of the data exceeds a preset total quantity of transmission times; and if the accumulative quantity of sending times of the data exceeds the preset total quantity of transmission times, instructs the sending module 21 not to resend the data; or if the accumulative quantity of sending times of the data does not exceed the preset total quantity of transmission times, instructs the determining module 20 to continue performing the foregoing determining operation until the judging module 22 determines that the sending module 21 does not need to resend the data. That is, the judging module 22 re-determines whether the sending module 21 initially transmits the data currently (certainly, the determining module 20 performs the determining operation again, which means that the data initially sent by the sending module 21 fails to be transmitted, and in this case, the data is not initially transmitted by the sending module 21); the determining module 20 re-determines the quantity of the first idle channels (in this case, there may be one determined first idle channel, or there may be multiple first idle channels), so that the sending module 21 is instructed to resend the data; and the judging module 22 re-determines whether the data is successfully transmitted; and if the data is successfully transmitted, instructs the sending module 21 not to resend the data; or if the data is not successfully transmitted, continues determining whether the accumulative quantity of sending times of the data exceeds the preset total quantity of transmission times until the judging module 22 instructs the sending module 21 not to resend the data when determining that the accumulative quantity of sending times of the data reaches the preset total quantity of transmission times.

According to the communications device provided in this embodiment of the present invention, a determining module determines a second idle channel that can be currently accessed by the communications device; a judging module determines whether data currently sent by a sending module is initially transmitted; and the determining module determines a quantity of first idle channels from the second idle channel, so that the sending module sends the data to a receiving end on each of the first idle channel; and the judging module further determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Based on the foregoing embodiment, in a third possible implementation manner of this embodiment of the present invention, this embodiment relates to a specific process in which when the sending module 21 sends, in a multicast manner, the data to the receiving end, the determining module 20 determines the quantity of the first idle channels and the judging module 22 determines whether the sending module 21 needs to resend the foregoing data. Further, the foregoing determining module 20 is specifically configured to: determine a second idle channel that can be currently accessed by the foregoing communications device; and determine, according to the second idle channel, the quantity of the first idle channels on which the sending module 21 sends the data. If a quantity of the second idle channels is equal to 1, the determining module 20 determines that the quantity of the first idle channels is equal to 1; or if a quantity of the second idle channels is greater than 1, the determining module 20 determines that the quantity of the first idle channels is greater than or equal to 1 and is less than or equal to the quantity of the second idle channels.

Specifically, when the sending module 21 sends, in the multicast manner by using a same version or different redundancy versions, the data to the receiving end on each of the first idle channels, the communications device performs sensing and backoff in all channels, and after a backoff process ends, at least one second idle channel is detected. If the quantity of the second idle channels is equal to 1, the determining module 20 determines that the quantity of the first idle channels is equal to 1; or if the quantity of the second idle channels is greater than 1, the determining module 20 determines that the quantity of the first idle channels is greater than or equal to 1 and is less than or equal to the quantity of the second idle channels.

In this embodiment, the judging module 22 does not need to determine whether the data is successfully transmitted, and only needs to directly determine whether an accumulative quantity of sending times of the data exceeds a preset total quantity of transmission times; and if the accumulative quantity of sending times of the data exceeds the preset total quantity of transmission times, the judging module 22 instructs the sending module 21 not to resend the data; or if the accumulative quantity of sending times of the data does not exceed the preset total quantity of transmission times, the judging module 22 instructs the determining module 20 to continue performing the foregoing determining operation until the judging module 22 determines that the sending module 21 does not need to resend the data. That is, the judging module 22 instructs the determining module 20 to re-determine the quantity of the first idle channels (referring to FIG. 5 and FIG. 6), so that the sending module 21 is instructed to resend the data; and determines whether the accumulative quantity of sending times of the data exceeds the preset total quantity of transmission times until the judging module 22 instructs the sending module 21 not to resend the data when determining that the accumulative quantity of sending times of the data reaches the preset total quantity of transmission times. In an example shown in FIG. 5, the determining module 20 selects two first idle channels when the data is initially transmitted (if the quantity k of the second idle channel determined by the determining module 20 is greater than 1, and the determined quantity of the first idle channels is 2, that is, a channel 1 and a channel 2 are selected); when the sending module 21 resends the data (in a subsequent transmission phase), the quantity that is of the first idle channel and is re-determined by the determining module 20 is also 2 (because the quantity k of the second idle channel re-determined by the determining module 20 is greater than 1), that is, the channel 1 and a channel 3 are selected. In an example shown in FIG. 6, the determining module 20 selects one first idle channel when the data is initially transmitted (because the quantity k of the second idle channel is equal to 1); when the sending module 21 resends the data (in a subsequent transmission phase), the determining module 20 selects three idle channels (channel 1, channel 2, and channel 3), because the quantity k of the second idle channel determined by the determining module 20 when the sending module 21 resends the data is greater than 1.

According to the communications device provided in this embodiment of the present invention, a determining module determines a second idle channel that can be currently accessed by the communications device, and determines a quantity of first idle channels according to the second idle channel, so that a sending module sends data to a receiving end on each of the first idle channel; and a judging module determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Based on the foregoing embodiment, in a fourth possible implementation manner of this embodiment of the present invention, this embodiment relates to a specific process in which when the sending module 21 sends, in a multicast manner, a group of data to the receiving end, the determining module 20 determines the quantity of the first idle channels and the judging module 22 determines whether the sending module 21 needs to resend the foregoing data. Further, the foregoing determining module 20 is specifically configured to: determine a second idle channel that can be currently accessed by the foregoing communications device; and determine, according to the second idle channel, the quantity of the first idle channels on which the sending module 21 sends the data. If a quantity of the second idle channels is equal to 1, the determining module 20 determines that the quantity of the first idle channels is equal to 1; or if a quantity of the second idle channels is greater than 1, the determining module 20 determines that the quantity of the first idle channels is greater than or equal to 1 and is less than or equal to the quantity of the second idle channels.

Specifically, when the sending module 21 sends, in the multicast manner by using a same version or different redundancy versions, a group of data to multiple receiving ends on each of the first idle channels, the communications device performs sensing and backoff in all channels, and after a backoff process ends, at least one second idle channel is detected. If the quantity of the second idle channels is equal to 1, the determining module 20 determines that the quantity of the first idle channels is equal to 1; or if the quantity of the second idle channels is greater than 1, the determining module 20 determines that the quantity of the first idle channels is greater than or equal to 1 and is less than or equal to the quantity of the second idle channels. FIG. 7 shows that, when the quantity of the second idle channels is greater than 1, and when the sending module 21 initially sends the data, the determining module 20 selects two first idle channels (a channel 1 and a channel 3), and a same group of data is separately sent consecutively concurrently, on the channel 1 and the channel 3 by using a same version or different redundancy versions, including Data 1, Data 2, and Data 3.

The sending module 21 separately sends, in a unicast manner, a BAR frame to all the receiving ends on the foregoing selected first idle channels (for example, the channel 1 and the channel 3 in FIG. 7), so that each of the receiving ends replies to the communications device with a BA frame. The judging module 22 determines, according to the replied multiple BA frames, whether all the data in the group is successfully transmitted. If all the data in the group is successfully transmitted, the judging module 22 instructs the sending module 21 not to resend the group of data; or if part of the data in the group is successfully transmitted, the judging module 22 instructs the determining module 20 to continue performing the foregoing determining operation until the judging module 22 determines that the sending module 21 does not need to resend unsuccessfully transmitted data in the data in the group. FIG. 8 shows that, when the sending module 21 initially transmits the group of data, the determining module 20 selects one first idle channel (a channel 3), and when part of the data (Data 2 in FIG. 8) in the group of data fails to be transmitted, the determining module 20 selects two first idle channels (a channel 2 and the channel 3) for the sending module 21 to retransmit the unsuccessfully transmitted data; the sending module 21 transmits the Data 2 on the channel 2 and the channel 3, and further transmits the BAR frame on the two channels.

Optionally, in all the foregoing possible implementation manners, the determining module 20 may determine, by using an RTS/CTS handshake manner, the second idle channel that can be currently accessed by the communications device.

According to the communications device provided in this embodiment of the present invention, a determining module determines a second idle channel that can be currently accessed by the communications device, and determines a quantity of first idle channels according to the second idle channel, so that a sending module sends data to a receiving end on each of the first idle channel; and a judging module determines whether the data needs to be resent to the receiving end, so as to ensure correct transmission of the data. By using the communications device provided in this embodiment of the present invention, the data can be transmitted on multiple first idle channels at the same time, and when the data needs to be resent, the multiple first idle channels may also be selected for sending the data, which improves robustness of data transmission; in addition, the multiple first idle channel in this embodiment of the present invention may not include a primary channel, and may not be consecutive channels, which improves utilization and flexibility of a channel.

Figure 10:
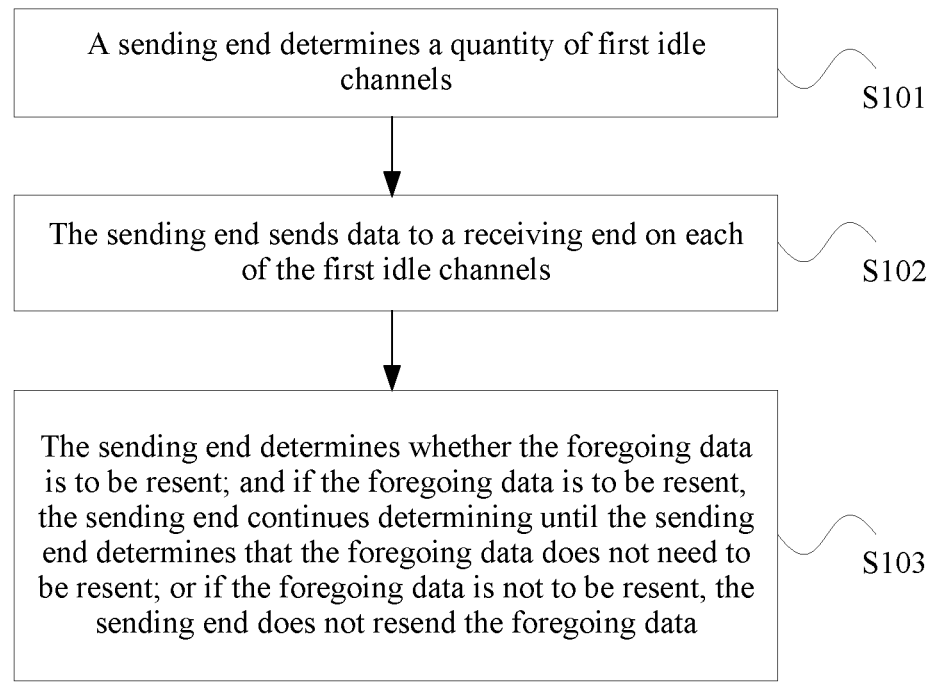
FIG. 10 is a schematic flowchart of Embodiment 1 of a data transmission method according to the present invention.

FIG. 10 is a schematic flowchart of Embodiment 1 of a data transmission method according to the present invention. A sending end executes the method, and the sending end may be the communications device in the foregoing embodiments. As shown in FIG. 10, the method includes:

S101. The sending end performs a determining operation, so as to determine a quantity of first idle channels.

S102. The sending end sends data to a receiving end on each of the first idle channels.

S103. The sending end determines whether the foregoing data is to be resent; and if the foregoing data is to be resent, the sending end continues performing the determining operation until the sending end determines that the foregoing data does not need to be resent; or if the foregoing data is not to be resent, the sending end does not resend the foregoing data.

For the data transmission method provided in this embodiment of the present invention, reference may be made to the foregoing embodiment of the communications device, where implementation principles and technical effects thereof are similar, and details are not described herein.

Further, the foregoing S101 may be specifically: The sending end determines a second idle channel that can be currently accessed by the sending end, and determines, according to the second idle channel, the quantity of the first idle channels on which the sending end sends the data. Optionally, the sending end may determine the second idle channel in an RTS/CTS handshake manner.

Further, the foregoing S102 may be specifically: The sending end sends, by using a same version or different redundancy versions, the data to the receiving end on each of the first idle channels, so that the receiving end performs decoding on the data.

For the data transmission method provided in this embodiment of the present invention, reference may be made to the foregoing embodiment of the communications device, where implementation principles and technical effects thereof are similar, and details are not described herein.

Optionally, the foregoing S101 may include: If a quantity of the second idle channels is equal to 1, the sending end determines that the quantity of the first idle channels is equal to 1; or if a quantity of the second idle channels is greater than 1, the sending end determines that the quantity of the first idle channels is greater than or equal to 1 and is less than or equal to the quantity of the second idle channels.

Optionally, the foregoing S101 may further include: The sending end determines whether the data currently sent is initially transmitted; and if the data currently sent is initially transmitted, the sending end determines that the quantity of the first idle channels is equal to 1; or if the data currently sent is not initially transmitted, the sending end determines that the quantity of the first idle channels is greater than or equal to 1 and is less than or equal to a quantity of the second idle channels.

When the sending end sends, in a unicast manner, the data to the receiving end on the first idle channel, the foregoing S103 specifically includes: The sending end determines whether the data is successfully transmitted; and if the data is successfully transmitted, the sending end does not resend the data; or if the data is not successfully transmitted, the sending end determines whether an accumulative quantity of sending times of the data exceeds a preset total quantity of transmission times; and if the accumulative quantity of sending times of the data exceeds the preset total quantity of transmission times, the sending end does not resend the data; or if the accumulative quantity of sending times of the data does not exceed the preset total quantity of transmission times, the sending end continues performing the determining operation until the sending end determines that the data does not need to be resent.

When the sending end sends, in a multicast manner, the data to the receiving end on the first idle channel, the foregoing S103 specifically includes: The sending end determines whether an accumulative quantity of sending times of the data exceeds a preset total quantity of transmission times; and if the accumulative quantity of sending times of the data exceeds the preset total quantity of transmission times, the sending end does not resend the data; or if the accumulative quantity of sending times of the data does not exceed the preset total quantity of transmission times, the sending end continues performing the determining operation until the sending end determines that the data does not need to be resent.

When the sending end sends, in a multicast manner, the data (the data is a group of data) to the receiving end on the first idle channel, and the sending end sends, in a unicast manner, a block acknowledgment request BAR frame to the receiving end on the first idle channel, so that the receiving end sends, according to the BAR frame, a block acknowledgment BA frame to the sending end, the foregoing S103 specifically includes: The sending end determines, according to the BA frame, whether all the data is successfully transmitted; and if all the data is successfully transmitted, the sending end does not resend the data; or if part of the data is successfully transmitted, the sending end continues performing the determining operation until the sending end determines that unsuccessfully transmitted data in the data does not need to be resent.

For the data transmission method provided in this embodiment of the present invention, reference may be made to the foregoing embodiment of the communications device, where implementation principles and technical effects thereof are similar, and details are not described herein.

A person of ordinary skill in the art may understand that all or some of the steps of the method embodiments may be implemented by a program instructing relevant hardware. The foregoing program may be stored in a computer readable storage medium. When the program runs, the steps of the foregoing method embodiment are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

Additionally, statements made herein characterizing the invention refer to an embodiment of the invention and not necessarily all embodiments.

What is claimed is:

1. A communications device comprising:
 a processor configured to initially determine a quantity of one or more idle channels, wherein the one or more idle channels are channels on which the communications device does not conflict with other communications devices during future sending of data; and
 a transmitter configured to cooperate with the processor to initially send data to a receiving end on each of the quantity of initially determined one or more idle channels;
 wherein the processor is further configured to:
  determine whether the data is to be resent; and
  in response to determining the data is to be resent, re-determine a quantity of idle channels for transmission of the data,
   wherein the quantity of re-determined idle channels is greater than the quantity of one or more initially determined idle channels,
   wherein the quantity of re-determined idle channels includes the initially determined one or more idle channels in response to a number of the initially determined one or more idle channels being one, and wherein the quantity of re-determined idle channels includes less than all of the initially determined one or more idle channels in response to a number of the initially determined one or more idle channels being two or more; and cause the transmitter to resend the data on each of the re-determined idle channels, wherein the data re-sent on each of the re-determined idle channels is identical to the data sent on the other re-determined idle channels.

2. The communications device according to claim 1, wherein the processor is further configured to determine the quantity of initially determined idle channels by:

determining whether data currently sent by the transmitter is initially transmitted; and if the data currently sent by the transmitter is not initially transmitted, determining that the quantity of initially determined idle channels is greater than 1 and is less than or equal to the quantity of re-determined idle channels.

3. The communications device according to claim 1, wherein the transmitter is further configured to cooperate with the processor to send the data by:

sending, in a unicast manner, the data to the receiving end on each of the initially determined idle channels; and wherein determining whether the data is to be resent further comprises:

determining whether the data is successfully transmitted;

determining whether an accumulative quantity of sending times of the data exceeds a preset total quantity of transmission times in response to determining the data is not successfully transmitted.

4. The communications device according to claim 1, wherein the transmitter is further configured to cooperate with the processor to send the data by:

sending, in a multicast manner, the data to the receiving end on each of the initially determined idle channels; and wherein determining whether the data is to be resent further comprises:

determining whether an accumulative quantity of sending times of the data exceeds a preset total quantity of transmission times.

5. The communications device according to claim 1, wherein the transmitter is further configured to cooperate with the processor to send the data by:

sending, in a multicast manner, the data to the receiving end on each of the re-determined idle channels, wherein the data comprises a group of data; and sending, in a unicast manner, a block acknowledgment request (BAR) frame to the receiving end on each of the re-determined idle channels, so as to facilitate the receiving end sending, according to the BAR frame, a block acknowledgment (BA) frame to the communication device.

6. The communications device according to claim 5, wherein the processor is further configured to determine whether the data is to be resent by:

determining, according to the BA frame, whether all the data is successfully transmitted.

7. A data transmission method comprising:

determining, by a sending end of a communications device, an initial quantity of one or more idle channels, wherein the one or more idle channels are channels on which the communications device does not conflict with other communications devices during future sending of data;

sending, by the sending end, data to a receiving end on each of the initially determined quantity of one or more idle channels;

determining, by the sending end, whether the data is to be resent; and in response to determining that the data is to be resent, re-determining, by the sending end, a quantity of idle channels for transmission of the data, wherein the quantity of re-determined idle channels is greater than the quantity of one or more initially determined idle channels, wherein the quantity of re-determined idle channels includes the initially determined one or more idle channels in response to a number of the initially determined one or more idle channels being one, and wherein the quantity of re-determined idle channels includes less than all of the initially determined one or more idle channels in response to a number of the initially determined one or more idle channels being two or more; and resending, by the sending end, the data on each of the re-determined idle channels, wherein the data re-sent on each of the re-determined idle channels is identical to the data sent on the other re-determined idle channels.

8. The method according to claim 7, wherein sending the data to the receiving end comprises:

sending, by the sending end in a unicast manner, the data to the receiving end on each of the initially determined one or more idle channels; and wherein determining whether the data is to be resent comprises:

determining, by the sending end, whether the data is successfully transmitted; and in response to determining that the data is not successfully transmitted, determining, by the sending end, whether an accumulative quantity of sending times of the data exceeds a preset total quantity of transmission times.

9. The method according to claim 7, wherein sending the data to the receiving end comprises:

sending, by the sending end in a multicast manner, the data to the receiving end on each of the initially determined one or more idle channels; and wherein determining whether the data is to be resent comprises:

determining, by the sending end, whether an accumulative quantity of sending times of the data exceeds a preset total quantity of transmission times.

10. The method according to claim 7, wherein sending the data to the receiving end comprises:

sending, by the sending end in a multicast manner, the data to the receiving end on each of the initially determined one or more idle channels, wherein the data comprises a group of data; and sending, by the sending end in a unicast manner, a block acknowledgment request (BAR) frame to the receiving end on each of the initially determined one or more idle channels, so as to facilitate the receiving end sending, according to the BAR frame, a block acknowledgment (BA) frame to the sending end.

11. The method according to claim 10, wherein determining whether the data is to be resent comprises:

determining, by the sending end according to the BA frame, whether all the data is successfully transmitted.

12. A non-transitory, computer readable medium storing instructions that, when executed by a processor, cause the processor to be configured to provide the following operations at a communications device: determining an initial quantity of one or more idle channels, wherein the one or more idle channels are channels on which the communications device does not conflict with other communications devices during future sending of data; sending data to a receiving end on each of the initially determined quantity of one or more idle channels; determining, by a sending end, whether the data is to be resent; in response to determining that the data is to be resent, re-determining, by the sending end, a quantity of idle channels for transmission of the data, wherein the quantity of re-determined idle channels is greater than the quantity of one or more initially determined idle channels, wherein the quantity of re-determined idle channels includes the initially determined one or more idle channels in response to a number of the initially determined one or more idle channels being one, and wherein the quantity of re-determined idle channels includes less than all of the initially determined one or more idle channels in response to a number of the initially determined one or more idle channels being two or more; and resending the data on each of the re-determined idle channels, wherein the data re-sent on each of the re-determined idle channels is identical to the data sent on the other re-determined idle channels.

13. The non-transitory computer readable medium of claim 12, wherein sending the data to the receiving end comprises:
   sending the data to the receiving end on each of the initially determined one or more idle channels;
   wherein determining whether the data is to be resent comprises determining whether the data is successfully transmitted; and
   in response to determining that the data is not successfully transmitted, determining whether an accumulative quantity of sending times of the data exceeds a preset total quantity of transmission times.

14. The non-transitory computer readable medium of claim 12, wherein sending the data to the receiving end comprises:
   sending, in a multicast manner, the data to the receiving end on each of the initially determined one or more idle channels; and
   wherein determining whether the data is to be resent comprises:
   determining whether an accumulative quantity of sending times of the data exceeds a preset total quantity of transmission times.

15. The non-transitory computer readable medium of claim 12, wherein sending the data to the receiving end comprises:
   sending, in a multicast manner, the data to the receiving end on each of the initially determined one or more idle channels, wherein the data comprises a group of data; and
   sending, in a unicast manner, a block acknowledgment request (BAR) frame to the receiving end on each of the initially determined one or more idle channels, so as to facilitate the receiving end sending, according to the BAR frame, a block acknowledgment (BA) frame to the sending end.

16. The non-transitory computer readable medium of claim 15, wherein determining whether the data is to be resent comprises determining, according to the BA frame, whether all the data is successfully transmitted.

* * * * *